US007477284B2

(12) United States Patent
Peleg et al.

(10) Patent No.: US 7,477,284 B2
(45) Date of Patent: Jan. 13, 2009

(54) SYSTEM AND METHOD FOR CAPTURING AND VIEWING STEREOSCOPIC PANORAMIC IMAGES

(75) Inventors: Shmuel Peleg, Mevaseret Zion (IL); Moshe Ben-Ezra, Jerusalem (IL); Yael Pritch, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 894 days.

(21) Appl. No.: 09/861,859

(22) Filed: Apr. 19, 2001

(65) Prior Publication Data

US 2004/0223051 A1 Nov. 11, 2004
US 2005/0157166 A9 Jul. 21, 2005

Related U.S. Application Data

(60) Provisional application No. 60/230,562, filed on Aug. 30, 2000, provisional application No. 60/217,152, filed on Jul. 6, 2000, provisional application No. 60/198,381, filed on Apr. 19, 2000, provisional application No. 60/113,962, filed on Dec. 28, 1998, provisional application No. 60/102,720, filed on Sep. 29, 1998, provisional application No. 60/100,721, filed on Sep. 17, 1998.

(51) Int. Cl.
*H04N 13/00* (2006.01)
(52) U.S. Cl. ........................................ 348/53
(58) Field of Classification Search .................. 348/36, 348/42, 51, 158, 218.1, 98, 44, 46, 48, 49, 348/52, 53; 382/154, 232, 294, 299, 284, 382/268; 352/57, 69–70; 396/324; *H04N 13/00*
See application file for complete search history.

(56) References Cited

U.S. PATENT DOCUMENTS

| 4,134,644 | A | | 1/1979 | Marks et al. ................. 350/132 |
| 5,455,689 | A | * | 10/1995 | Taylor et al. ................. 358/450 |
| 5,594,498 | A | * | 1/1997 | Fraley ......................... 348/158 |
| 5,649,032 | A | * | 7/1997 | Burt et al. .................... 382/284 |
| 5,657,073 | A | | 8/1997 | Henley et al. |
| 5,721,585 | A | | 2/1998 | Keast et al. ................... 348/36 |
| 5,764,871 | A | * | 6/1998 | Fogel .......................... 345/427 |
| 5,825,466 | A | | 10/1998 | Lo et al. ....................... 355/33 |
| 5,963,664 | A | * | 10/1999 | Kumar et al. ................ 382/154 |
| 5,986,668 | A | * | 11/1999 | Szeliski et al. ............... 345/634 |
| 5,991,444 | A | * | 11/1999 | Burt et al. .................... 382/232 |

(Continued)

FOREIGN PATENT DOCUMENTS

EP 0361297 4/1990

(Continued)

OTHER PUBLICATIONS

Peleg, Schmuel et al., "Stereo Panorama with a Single Camera", IEEE, 1999, pp. 395-401.

(Continued)

*Primary Examiner*—Tung Vo
(74) *Attorney, Agent, or Firm*—Browdy and Neimark, P.L.L.C.

(57) ABSTRACT

Method and apparatus for generating images of a scene from image data of the scene and displaying the images to provide a sense of depth. In some embodiments of the method and apparatus the generated images are mosaics.

55 Claims, 6 Drawing Sheets

U.S. PATENT DOCUMENTS

| | | | | |
|---|---|---|---|---|
| 6,075,905 | A * | 6/2000 | Herman et al. | 382/284 |
| 6,078,701 | A * | 6/2000 | Hsu et al. | 382/294 |
| 6,083,353 | A * | 7/2000 | Alexander, Jr. | 202/158 |
| 6,141,145 | A | 10/2000 | Nalwa | |
| 6,275,206 | B1 * | 8/2001 | Tsai et al. | 345/88 |
| 6,278,480 | B1 * | 8/2001 | Kurahashi et al. | 348/59 |
| 6,377,294 | B2 * | 4/2002 | Toyofuku et al. | 348/36 |
| 6,434,280 | B1 * | 8/2002 | Peleg et al. | 382/299 |
| 6,435,969 | B1 * | 8/2002 | Tanaka et al. | 463/44 |
| 6,512,892 | B1 * | 1/2003 | Montgomery et al. | 396/326 |
| 6,522,787 | B1 * | 2/2003 | Kumar et al. | 382/268 |
| 6,532,036 | B1 * | 3/2003 | Peleg et al. | 348/36 |
| 6,532,298 | B1 * | 3/2003 | Cambier et al. | 382/117 |
| 6,535,650 | B1 * | 3/2003 | Poulo et al. | 382/284 |
| 6,643,413 | B1 * | 11/2003 | Shum et al. | 382/284 |
| 6,665,003 | B1 * | 12/2003 | Peleg et al. | 348/36 |
| 6,717,608 | B1 * | 4/2004 | Mancuso et al. | 348/36 |
| 6,750,860 | B1 * | 6/2004 | Shum et al. | 345/419 |
| 6,831,677 | B2 * | 12/2004 | Peleg et al. | 348/36 |
| 6,850,210 | B1 * | 2/2005 | Lipton et al. | 345/6 |
| 6,956,573 | B1 * | 10/2005 | Bergen et al. | 345/473 |
| 2001/0010546 | A1 * | 8/2001 | Chen | 348/218 |
| 2001/0020976 | A1 | 9/2001 | Peleg et al. | |
| 2001/0038413 | A1 | 11/2001 | Peleg et al. | |
| 2001/0043264 | A1 * | 11/2001 | Sinclair et al. | 348/36 |

FOREIGN PATENT DOCUMENTS

| | | | |
|---|---|---|---|
| EP | 0 989 436 A2 | | 3/2000 |
| EP | 0989436 | | 3/2000 |
| IL | WO 98/34195 | * | 8/1998 |
| JP | 11 146425 | | 5/1999 |
| JP | 11146425 | | 5/1999 |
| JP | 11 164326 | | 6/1999 |
| JP | 11164326 | | 6/1999 |
| WO | WO 99/17555 | | 4/1999 |
| WO | WO 99/18725 | | 4/1999 |

OTHER PUBLICATIONS

Ishiguro, H. et al.; "Correspondence, Omni-Directional Stereo"; IEEE Transactions on Patern Analysis and Machine Intelligence, vol. 14, Feb. 1992; pp. 257-262.

Gluckman, J. et al.; "Real-Time Omnidirectional and Panoramic Stereo"; Proc. Of Image Understanding Workshop, IUW98;1998; 5 Pages; Retrieved from the Internet: <http://cis.poly.edu/~gluckman/papers/uw98a.pdf>.

* cited by examiner

SYSTEM AND METHOD FOR CAPTURING AND VIEWING STEREOSCOPIC PANORAMIC IMAGES

RELATED APPLICATIONS

This application is a continuation-in-part of U.S. application Ser. No. 09/792,638 filed On Feb. 24, 2001, U.S. application Ser. No. 09/726,198 filed on Nov. 29, 2000 now U.S. Pat. No. 6,795,109, and U.S. application Ser. No. 09/396,248 filed on Sep. 16, 1999, now U.S. Pat. No. 6,665,003. U.S. application Ser. No. 09/726,198 is a continuation-in-part of U.S. application Ser. No. 09/396,248. This application also claims the benefit under 119(e) of U.S. provisional application 60/198,381 filed on Apr. 19, 2000, U.S. provisional application 60/217,152 filed Jul. 6, 2000 and U.S. provisional application 60/230,562 filed on Aug. 30, 2000.

INCORPORATION BY REFERENCE

U.S. patent application Ser. No. 09/396,248, filed Sep. 16, 1999, in the names of Shmuel Peleg, et al., entitled "System and Method for Generating and Displaying Panoramic Images and Movies,"(hereinafter referred to as "the Peleg I patent application") assigned to the assignee of the present application, incorporated herein by reference.

U.S. patent application Ser. No. 09/726,198, filed Nov. 29, 2000, in the names of Shmuel Peleg, et al., entitled "Stereo Panoramic Camera Arrangements For Recording Panoramic Images Useful In A Stereo Panoramic Image Pair," (hereinafter referred to as "the Peleg II patent application") assigned to the assignee of the present application, incorporated herein by reference.

U.S. patent application Ser. No. 09/792,638, filed Feb. 24, 2001, in the names of Shmuel Peleg, et al., entitled "System And Method For Facilitating The Adjustment Of Disparity In A Stereoscopic Panoramic Image Pair,"(hereinafter referred to as "the Peleg III patent application") assigned to the assignee of the present application, incorporated herein by reference.

FIELD OF THE INVENTION

The invention relates generally to the field of recording and generating images, and more particularly to the generation, displaying and printing of panoramic images stereoscopically. The invention specifically provides a system and method for generating and displaying a stereoscopic panoramic image set, comprising respective at least two panoramic images of a scene, each having a different viewing direction, for contemporaneous viewing by respective left and right eyes of a viewer to provide an apparent stereoscopic image of the scene to the viewer.

BACKGROUND OF THE INVENTION

Panoramic images are images of a scene having a wide field of view, up to a full 360°. Panoramic images may be recorded using a wide angled lens, a mirror, or the like, providing a wide field of view. Panoramic images having a wider field of view can be generated by, for example, recording a plurality of images around a particular point and, using conventional mosaicing techniques, generating a single mosaic image. Panoramic images may also be generated of simulated scenes using conventional computer graphics techniques. Stereoscopic panoramic images can also be generated from images using various techniques known to those skilled in the art. In one technique, described in Joshua Gluckman, et al., "Real-Time Omnidirectional And Panoramic Stereo," DARPA Image Understanding Workshop, 1998, two omnidirectional cameras, vertically displaced along a common axis, record panoramic images of the surrounding scene. Since the cameras are displaced, the pair of images recorded by the cameras, when considered in combination, will provide depth information for objects in the scene surrounding the cameras. However, since the displacement is vertical, the recorded images are inappropriate for human stereo panoramic perception.

SUMMARY OF THE INVENTION

The invention provides a new and improved system and method for generating and displaying a stereoscopic panoramic image set, comprising respective at least two panoramic images of a scene, each having a different viewing direction, for contemporaneous viewing by respective left and right eyes of a viewer to provide an apparent stereoscopic image of the scene to the viewer.

In brief summary, the invention provides an arrangement for recording images for use in generating and utilizing images comprising a stereoscopic image set. The arrangement includes at least one stereoscopic data source, at least one utilization device and a distribution channel. The at least one stereoscopic data source records images from which a stereoscopic image set can be generated. The utilization device is provided to facilitate viewing, printing, or otherwise utilizing the stereoscopic image set. The distribution channel facilitates transferring information between the stereoscopic data source and the utilization device, the information including the images as recorded by the stereoscopic data source or the stereoscopic image set itself. If a stereoscopic image set is to comprise a plurality of mosaic images, the mosaic images may be generated by the stereoscopic data source, the image utilization device and/or the distribution channel.

A number of stereoscopic data sources of diverse configurations are disclosed, including fixed and moving mirrors, prisms, and lenses, which may be used in the stereoscopic data source in the stereoscopic image arrangement.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
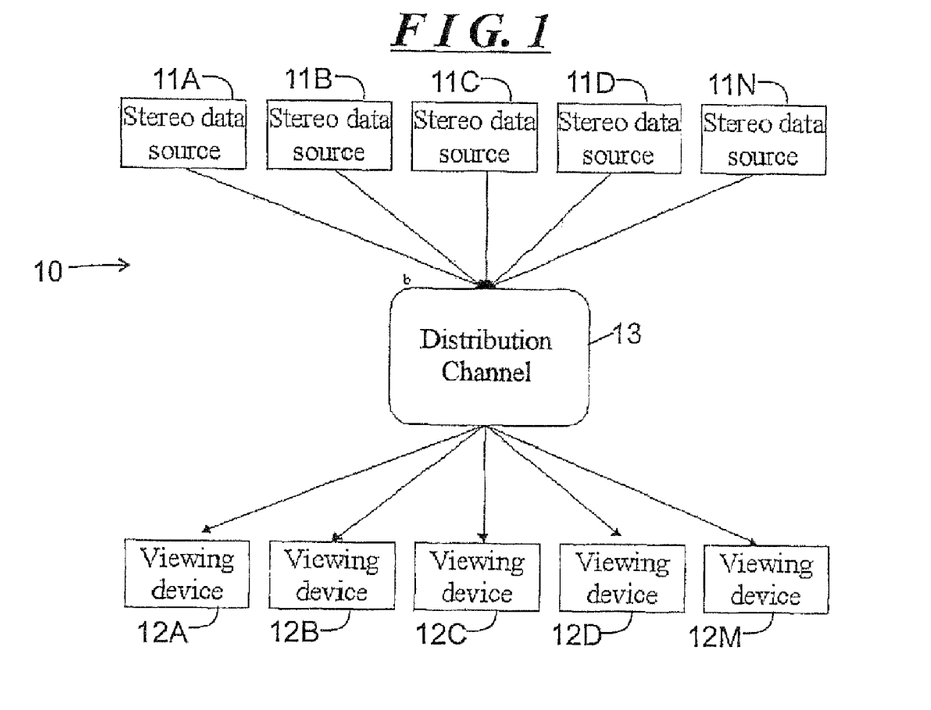
FIG. 1 schematically depicts a stereoscopic panoramic image arrangement for recording, generating and displaying stereoscopic panoramic images, constructed in accordance with the invention.

FIG. 1 schematically depicts a stereoscopic panoramic image arrangement 10 for recording, generating and displaying stereoscopic panoramic images, constructed in accordance with the invention. With reference to FIG. 1, the stereoscopic panoramic image arrangement 10 includes one or more stereoscopic data sources 11A through 11N (generally identified by reference numeral 11n) and one or more viewing devices 12A through 12M (generally identified by reference numeral 12m). Generally, each stereoscopic data source 11n records images and generates therefrom at least one stereoscopic panoramic image set comprising a set of panoramic images. Each stereoscopic data source 11n can also transmit respective stereoscopic panoramic image sets that it generates through a distribution channel 13 to one or more of the viewing devices 12m for viewing, generation of lenticular prints, or other disposition as will be apparent to those skilled in the art.

Figure 2:
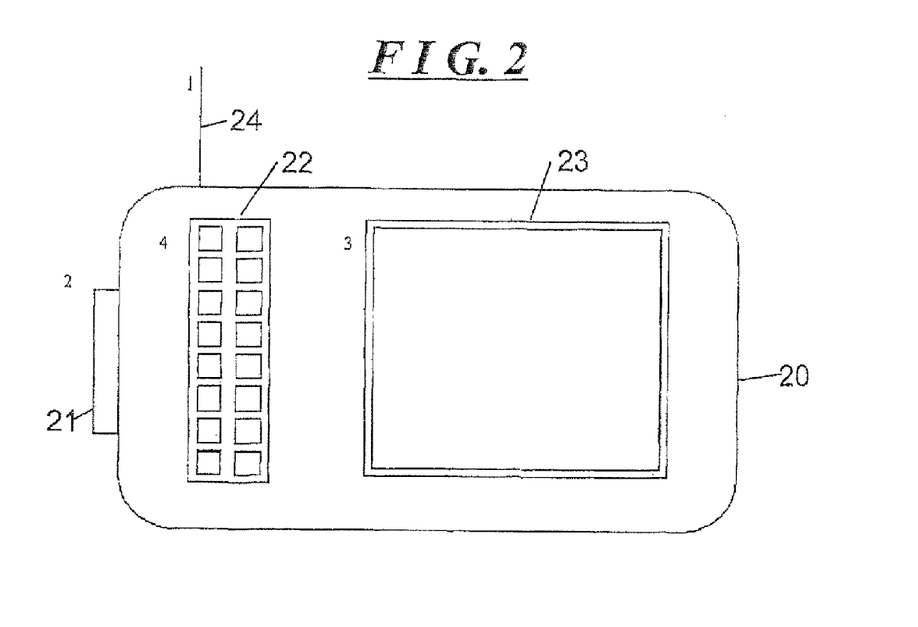
FIG. 2 schematically depicts an exterior plan view of an illustrative stereoscopic data source for use in connection with the arrangement depicted in FIG. 1.

An illustrative stereoscopic data source 11n will be described below in connection with FIGS. 2 and 3. Generally, the stereoscopic data source 11n will include an image recording arrangement, an image processing arrangement and a communication arrangement. The image recording arrangement records one or more images from which a stereoscopic panoramic image set is generated. The image recording arrangement may be similar to those described in the Peleg I or Peleg II patent applications. If the image recording arrangement is similar to that described in the Peleg I patent application, or to those described in the Peleg II patent application for which the arrangement is rotated and/or translated to facilitate recording of images from which a panoramic image is generated, at least the image recording arrangement records a series of images as it is rotated around an axis comprising a center of rotation, translated along a path, or any combination of rotation and translation. As the image recording arrangement is rotated and/or translated, it records a series of images from which the image processing arrangement generates at least one set of panoramic images comprising a stereoscopic panoramic image set as described in the Peleg I patent application, or as described below in connection with FIG. 5. Generally, in generating a stereoscopic panoramic image set, the image recording arrangement will record a series of images. For each panoramic image in a stereoscopic panoramic image set, the image processing arrangement will generate the panoramic image by mosaicing together strips from successive ones of the images. The strips obtained from the respective images may all have the same displacement from the center of the respective images, as described in the Peleg I patent applications, or they may have different displacements, as described in the Peleg III patent application. Alternatively, as noted above, the panoramic images may be generated as described below in connection with FIG. 5.

Alternatively, the image recording arrangement may be similar to those described in the Peleg II patent application. For several of the image recording arrangements that are described in the Peleg II patent application, the respective arrangements may also be rotated and/or translated to facilitate recording of a series of images from which strips may be mosaiced together to generate a set of panoramic images comprising a stereoscopic panoramic image set. On the other hand, for others of the image recording arrangement described in the Peleg II patent application, the respective arrangements may be those including omni-cameras, which arrangements can directly record panoramic images for a stereoscopic panoramic image set without requiring mosaicing.

The communication arrangement facilitates transmission of the stereoscopic panoramic image set to the distribution channel 13 for distribution to one or more of the viewing devices 12m. Generally, information defining the stereoscopic panoramic image set transferred by the communication arrangement will be in digital form, and the communication arrangement may include any arrangement that facilitates transfer of digital data between two devices, which may be at the same location or at different locations. Illustrative communication arrangements include, for example, a direct connection, such as a wire, cable or optical fiber connection, a wireless connection, any other arrangement for facilitating the transfer of information in digital form, or any combination thereof. A direct connection may include, for example, a direct network connection, an indirect connection to a network through, for example, a computer, a connection through the public switched telephony network, and the like. A wireless connection may include, for example, a radio connection, a cellular telephone connection, an infrared connection, and the like An illustrative viewing device will be described below in connection with FIG. 4. Generally, the viewing device will include an a communication arrangement, an image storage arrangement and a display, printer or other device for generating images for viewing by a viewer. The viewing device's communication arrangement facilitates reception of the stereoscopic panoramic image set from the distribution channel 13. Generally, information defining the stereoscopic panoramic image set received by the communication arrangement will be in digital form, and the communication arrangement may include a direct connection, such as a wire, cable or optical fiber connection, a wireless connection, such as a cellular telephone connection, or any other arrangement for facilitating the transfer of information in digital form.

The image storage arrangement stores the digital information comprising a stereoscopic panoramic image set as received by the viewing device's communication arrangement from the distribution channel 13 for later display. Depending on the amount of information that can be stored in the image storage arrangement and the amount of information comprising an stereoscopic panoramic image set, the image storage arrangement may have the capacity to store information comprising only one stereoscopic panoramic image set, or it may have the capacity to store information comprising a plurality of stereoscopic panoramic image sets.

The display, if provided, will display at least a portion of one or more of the images comprising a stereoscopic panoramic image set. It will be appreciated that, if the display displays at least a portion of one of the images, the image, when viewed, will not be stereoscopic. On the other hand, if the display displays at least a portion of both images using, for example, a lenticular lens, as will be described below in connection with FIG. 6, the images, when viewed, will be stereoscopic. If a printer is provided, the printer can generate hardcopy prints of one or more of the images comprising a stereoscopic panoramic image set, and may generate, for example, lenticular prints, as will be described below in connection with FIG. 6, which can be viewed by a viewer using a lenticular lens to provide a stereoscopic image of the scene represented by the stereoscopic panoramic image set.

It will be appreciated that both each stereoscopic data source 11n and viewing device 12m may also include control arrangements for facilitating control thereof by a respective operator. For example, if the stereoscopic data source 11n includes an image recording arrangement that is to be rotated and/or translated, it can include a control to enable the image recording arrangement to rotate and/or translate. In addition, the stereoscopic data source 11n can include controls to allow an operator to actuate the image recording arrangement to facilitate recording of images of a scene, to enable generation by the image processing arrangement of a stereoscopic panoramic image set for the scene, and to enable the communication arrangement to transmit an stereoscopic panoramic image set to the distribution channel 13 for transfer to one or more of the viewing devices.

Similarly, the respective viewing device 12m can include a control to facilitate receiving of stereoscopic panoramic image sets from the distribution channel 13 and storage by the image storage arrangement. In addition, the respective viewing device 12m can include a control to facilitate selection of a stereoscopic panoramic image set for display, selection of display mode, and selection of a portion of the stereoscopic panoramic image set to be displayed. The viewing device 12m may be able to selectively display, as well as at least portions of a stereoscopic panoramic image set, at least portions of individual panoramic images of the stereoscopic panoramic image set as respective display modes, and the selection of the display mode can facilitate display of one or more of the panoramic images of the selected stereoscopic panoramic image set. In addition, the viewing device 12m can include a control to facilitate selection of a respective portion of an stereoscopic panoramic image set that is to be displayed, or the portion of an individual image from the stereoscopic panoramic image set that is to be displayed of the viewing device 12m provides such display modes.

As noted above, a viewing device 12m can, instead of or in addition to providing a display for displaying an stereoscopic panoramic image set with a lenticular lens to provide for stereoscopic viewing, provide a printer or similar device for generating a hardcopy print of at least a portion of one or both of the images comprising a stereoscopic panoramic image set, or a hardcopy print of at least a portion of the stereoscopic panoramic image set that, when viewed through a lenticular lens, would provide a stereoscopic panorama. A viewing device 12m that provides a printer or similar device can include controls for enabling it to generate such hardcopy prints.

With this background, an illustrative stereoscopic data source 11n will be described in connection with FIGS. 2 and 3. FIG. 2 depicts an exterior plan view of the illustrative stereoscopic data source 11n, and FIG. 3 depicts a functional block diagram of the illustrative stereoscopic data source. Generally, the illustrative stereoscopic data source 11n is a portable device that can be, for example, hand-held by an operator, mounted on a vehicle, or the like, and rotated and/or translated to facilitate recording of the series of images from which the stereoscopic panoramic image set is generated. In addition, the transfers the digital information comprising the stereoscopic panoramic image set over a cellular telephone communication link. With reference to FIG. 2, the illustrative stereoscopic data source 11n includes a housing 20 that houses and supports a video camera 21, an operator control panel 22, a display 23 and an antenna 24. The video camera 21 provides the image recording arrangement described above, and the operator control panel 22 comprises a plurality of controls that may be actuated to enable the video camera 21 to perform predetermined operations. The controls can be implemented in a number of ways, including, for example, pushbuttons that may be depressed by the operator to actuate the respective control.

After the operator energizes the stereoscopic data source 11n by actuating a respective control on the operator control panel 22, he or she can directs the video camera 21 in a particular direction. The display 23 can display an image indicating what the video camera 21 can record. The operator can enable the video camera by actuating a control on the operator control panel 22. As the operator actuates the image recording control, and rotates and/or translates the stereoscopic data source 11n, he or she can enable the video camera 21 to record a series of images from which a stereoscopic panoramic image set can be generated. After the stereoscopic data source 11n has recorded a series of images, the operator can release the image recording control, at which point the video camera 21 can stop recording of images.

After the stereoscopic data source 11n has recorded a series of images, the operator can actuate another control on the operator control panel to enable the stereoscopic data source 11n to generate the panoramic images comprising the stereoscopic panoramic image set. After at least one of the panoramic images has been generated, the operator can actuate another control on the operator control panel 22 to enable the stereoscopic data source 11n to display at least a portion the generated panoramic image in the display 23, with the portion being selectable by use of the same or another control on the operator control panel 22. Similarly, after at least two panoramic images of the stereoscopic panoramic image set have been generated, the operator can actuate a control on the operator control panel 22 to enable the stereoscopic data source 11n to display them in a manner so that they can be viewed stereoscopically. The stereoscopic data source 11n may display the stereoscopic panoramic image set in a manner such that any a number of kinds of appliances may be required to facilitate stereoscopic viewing, including, for example, a lenticular lens, glasses with polarized lenses or lenses of different color, or other appliances as will be appreciated by those skilled in the art, with the stereoscopic data source 11n displaying the stereoscopic panoramic image set in a corresponding manner.

In addition, after the stereoscopic data source 11n has generated the panoramic images comprising the stereoscopic panoramic image set, it can transmit them to the distribution channel for distribution to respective ones of the viewing devices 12m. As noted above, the illustrative stereoscopic data source 11n makes use of a cellular telephone connection to transfer information to the distribution channel 13. Accordingly, the operator can actuate one or more other controls on the operator control panel 22 to enable the stereoscopic data source 11n to establish a cellular telephone call to the distribution channel 13 through a cellular provider (not shown). In that case, the stereoscopic data source 11n can establish a cellular link through the antenna 24.

Figure 3:
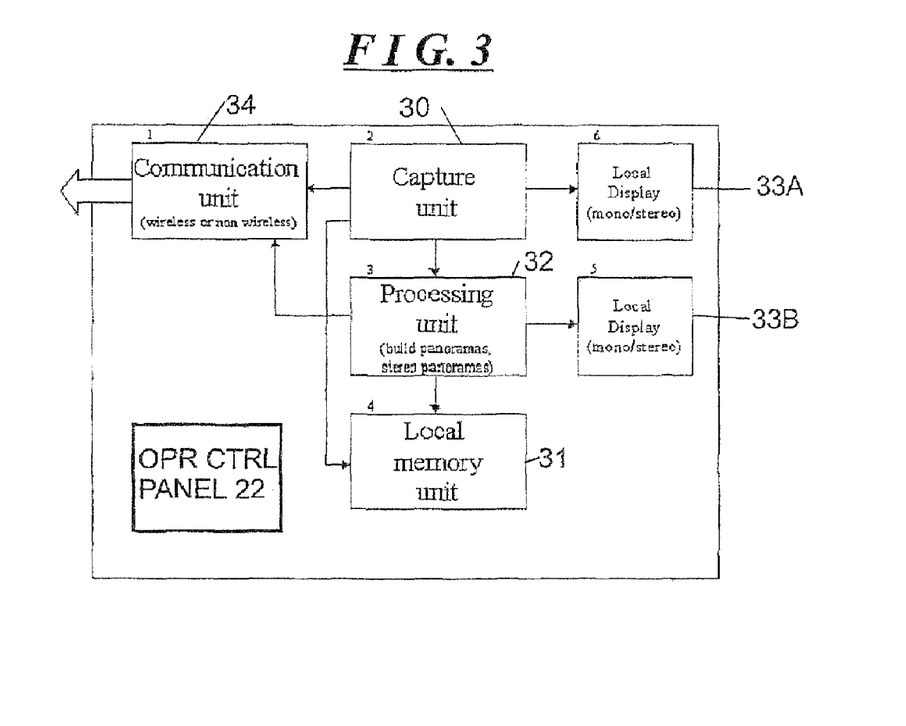
FIG. 3 depicts a functional block diagram of the stereoscopic data source depicted in FIG. 2.

FIG. 3 depicts a functional block diagram of the stereoscopic data source 11n described above in connection with FIG. 2. With reference to FIG. 3, the stereoscopic data source 11n includes an image capture unit 30, a local memory unit 31, a processing unit 32, one or more local displays 33A, 33B, . . . , and a communication unit 34, as well as the operator control panel 22. The image capture unit 30, local memory unit 31 and processing unit 32 together form the video camera 21 described above in connection with FIG. 2, and the local displays 33A, 33B, . . . form the display 23 described above in connection with FIG. 2. The capture unit 30 will include, for example, an image sensor, aperture, lenses, and/or the like to facilitate capturing or acquiring of the respective images. The image sensor may be any of a number of conventional image sensors, including, for example, CCD (charge coupled devices), film, and the like.

Generally, after the operator energizes the stereoscopic data source 11n by actuating a respective control on the operator control panel 22, the processing unit can control the capture unit 30, in particular the image sensor, to begin receiving images, and send them to a local display, for example, local display 33A, for display to the operator. When the operator actuates the image recording control on the operator control panel 22, the processing unit 32, in addition to sending images from the image sensor to the local display 33A for display to the operator, will send the images to the local memory unit 31 for storage. In addition, when the operator actuates the stereoscopic panoramic image set generation control on the operator control panel 22, the processing unit 32 will generate the panoramic images comprising the stereoscopic panoramic image set and can display them in the local displays 33A, 33B, . . . .

Furthermore, when the operator actuates the stereoscopic panoramic image set transmission control on the operator control panel 22, the processing unit 32 enables the panoramic images comprising the stereoscopic panoramic image set to be transmitted through the communication unit 34 to the distribution channel 13. In that operation, since, as noted above, the stereoscopic data source 11n makes use of a cellular telephone links to facilitate transfer of stereoscopic panoramic image sets to the distribution channel 13, the processing unit 32 can initiate a cellular telephone call to the distribution channel 13 and, after the distribution channel 13 responds, cooperate with the distribution channel 13 to facilitate transmission of the stereoscopic panoramic image set to the distribution channel 13. The processing unit 32 can use a predetermined telephone number in initiating the cellular telephone call, or it can make use of a telephone number provided by the operator through the operator control panel 22. Accordingly, the operator control panel 22 can include a numeric keypad that the operator can use to provide the telephone number. It will be appreciated that the processing unit 32, prior to transferring the information comprising the stereoscopic panoramic image set, can also encode the information using any of a plurality of encoding or compression algorithms, such as the well known JPEG or GIF algorithms, which can facilitate a reduction of the time that might be required to transfer the information.

Figure 4:
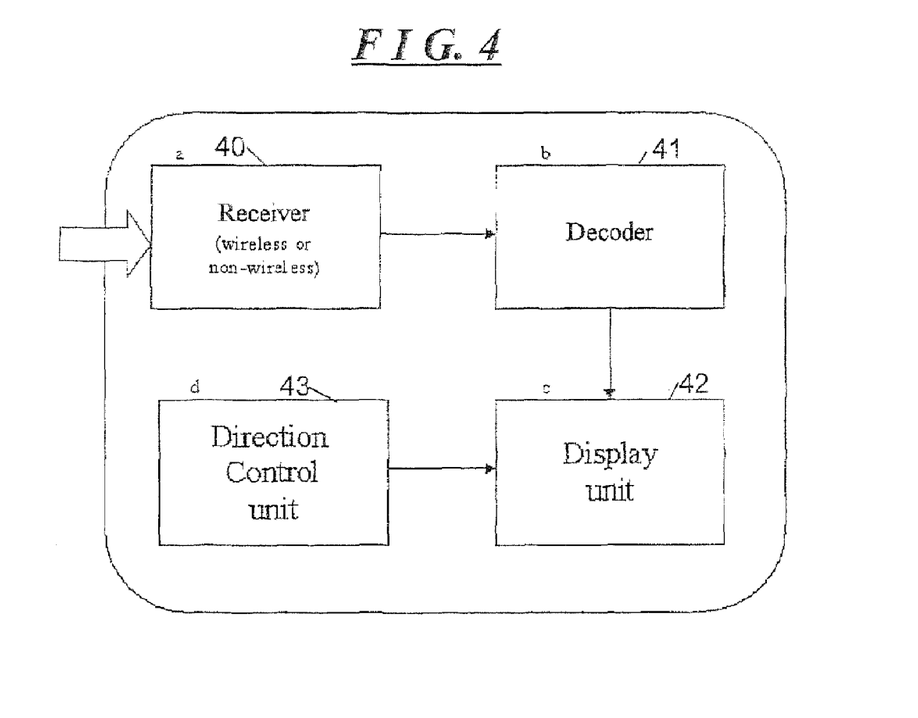
FIG. 4 depicts a functional block diagram of an illustrative viewing device depicted in FIG. 3.

As noted above, the viewing devices selectively receive panoramic images comprising respective ones of the stereoscopic panoramic image sets generated by the stereoscopic data sources 11n and display them to an operator. FIG. 4 depicts a functional block diagram of an illustrative viewing device 12m constructed in accordance with the invention. With reference to FIG. 4, the illustrative viewing device 12m includes a receiver 40, a decoder 41, a display unit 42 and a direction control unit 43. The receiver 40 is provided to receive information defining the panoramic images comprising a stereoscopic panoramic image set from the distribution channel 13. The receiver 40 provides the information to the decoder 41 for decoding. After the decoder 41 has decoded the digital information, it can provide it to the display unit 42 for display to the operator. The display unit 42 includes a display device for displaying images to a viewer and may also include sufficient memory for storing panoramic images comprising one or more stereoscopic panoramic image sets. If the display unit 42 does include sufficient memory for storing panoramic images comprising a plurality of stereoscopic panoramic image sets, the viewing device 12m can also include a control that allows an operator to select a stereoscopic panoramic image set for display. If the display unit 42 is unable to display the entire stereoscopic panoramic image set at one time, the direction control unit 43 can allow a viewer to select a portion of the stereoscopic panoramic image set to be displayed.

The display unit 42 preferably displays the stereoscopic panoramic image set in a stereoscopic manner. In that case, the display unit 42 may display respective images of the stereoscopic panoramic image set in separate left and right displays, each of which can be viewed by a respective one of the viewer's eyes. A binocular device may be provided having respective ocular devices to that displays a respective image, or portion thereof, to a respective one of the eyes of the viewer. Alternatively, the display unit 42 may display the panoramic images such that, when viewed using any of a number of kinds of appliances used facilitate stereoscopic viewing, including, for example, a lenticular lens, glasses with polarized lenses or lenses of different color, or other appliances as will be appreciated by those skilled in the art, the images will be viewed stereoscopically.

Figure 5:
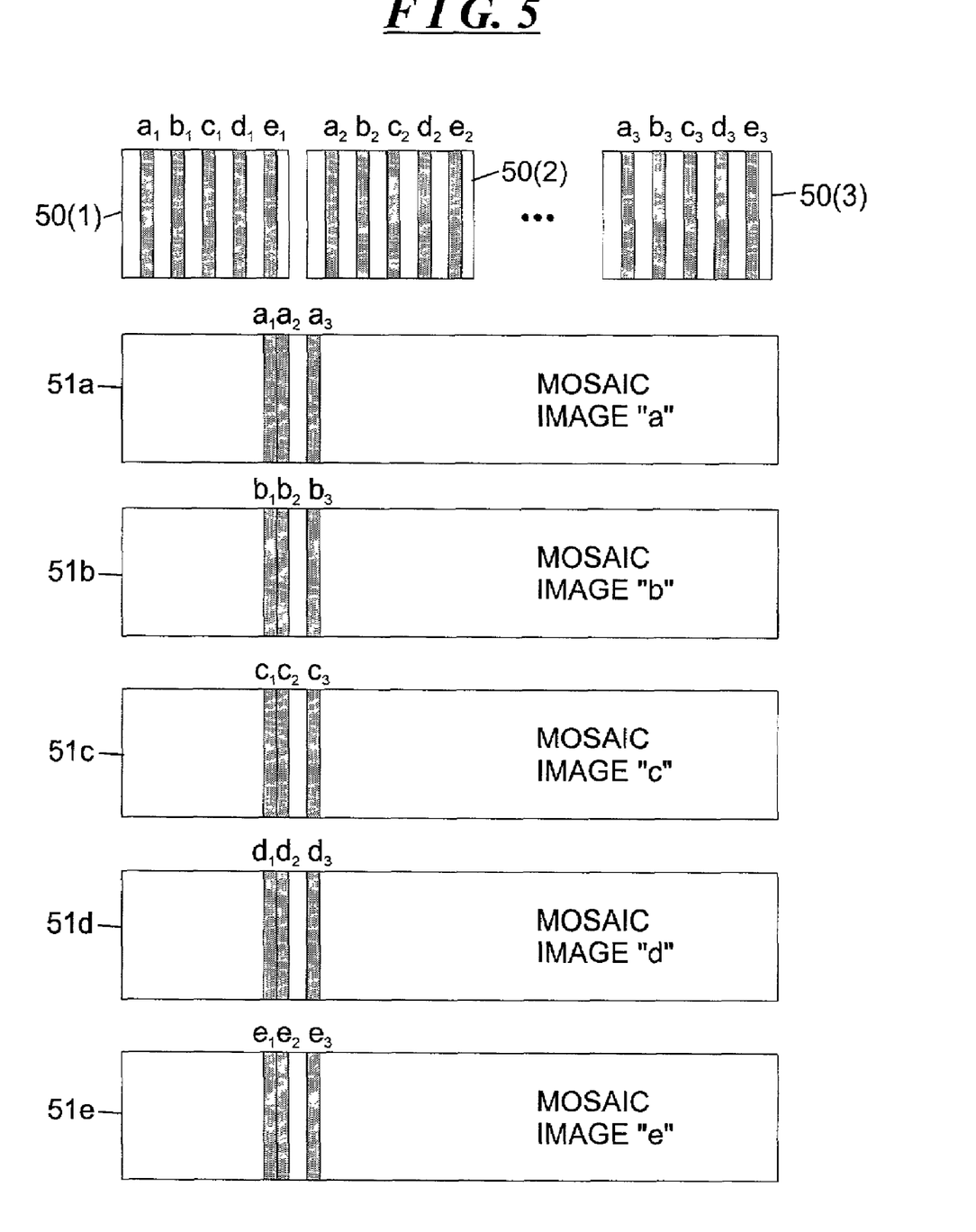
FIG. 5 is useful in understanding the operations performed by the stereoscopic panoramic image arrangement depicted in FIG. 1 in connection with generating a stereoscopic panoramic set.

As noted above, as described in connection with the Peleg I and II applications, two panoramic images comprising a stereoscopic panoramic image set can be generated using two strips from each of a series of images recorded by the stereoscopic data source 11n. Alternatively, a stereoscopic panoramic image set, comprising a plurality of panoramic images, may be generated that, when the panoramic images are viewed in sets, will provide a stereoscopic image. This will be described in connection with FIG. 5. With reference to FIG. 5, FIG. 5 depicts a series of successive image 50(1), 50(2), . . . 50(3) (generally identified by reference numeral 50(i)) that are recorded by the stereoscopic data source 11n as the stereoscopic data source 11n is translated and/or rotated. A plurality of panoramic images 51a, 51b . . . comprising a stereoscopic panoramic image set are generated using respective strips $a_1, a_2, \ldots a_3, b_1, b_2, \ldots b_3, \ldots$ from the respective images 50(i). Strips $a_1, a_2, \ldots a_3$ that are used in image 51a all from the same horizontal displacement from the center of the respective images 50(i), strips $b_1, b_2 \ldots b_3$ that are used in image 51b are all from same horizontal displacement from the center of the respective images 50(i), and so forth. It will be appreciated that, if the images 51(i) are viewed in pairs, they will provide stereoscopic depth since they will effectively have different viewing directions.

Figure 6:
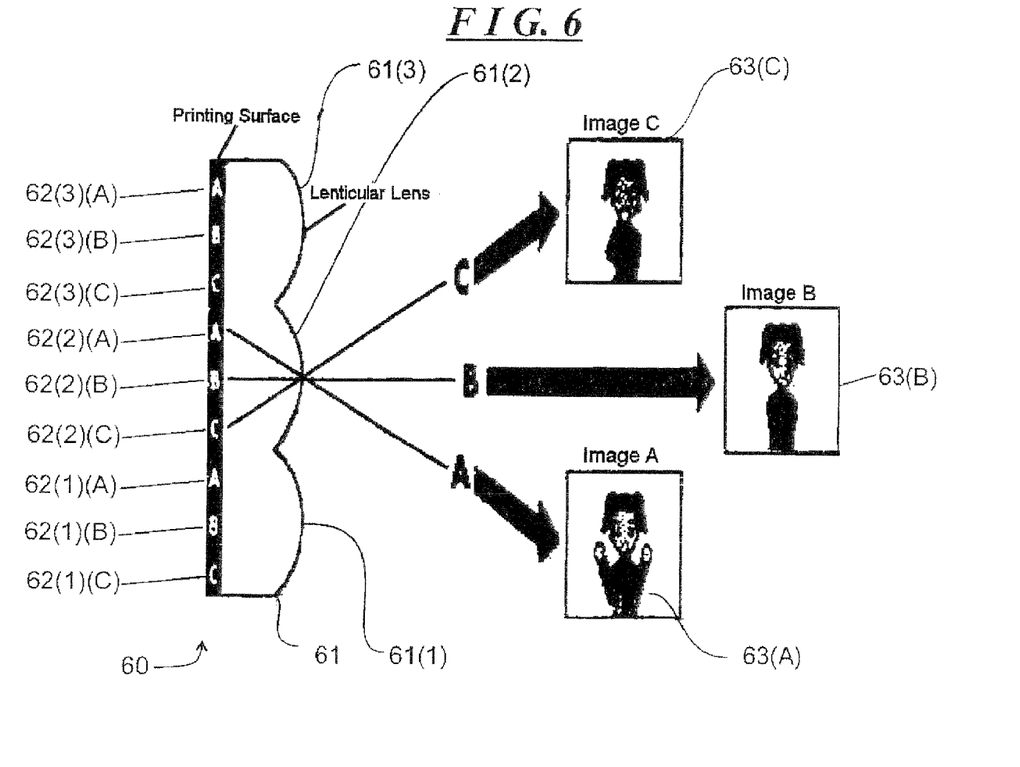
FIG. 6 is useful in understanding the arrangement for generating and displaying lenticular prints.

As further noted above, the display 23, 33A, 33B (stereoscopic data source 11n) and display 42 (viewing device 12m) can display panoramic images comprising a stereoscopic panoramic image set using a lenticular lens, which can provide a stereoscopic image. This will be described in connection with FIG. 6. With reference to FIG. 6, the lenticular lens 61 includes a flat rear surface and a curved forward surface. The panoramic images from a stereoscopic panoramic image set are projected, in segments, at the flat rear surface of the lenticular lens, and the viewer views the stereoscopic image by looking towards the forward surface. For the illustrative lenticular lens 61 depicted in FIG. 6, three segments are depicted 61(1) through 61(3) (generally identified by reference numeral 61(s)), each of which is associated with a curved forward surface. Each segment 61(s), in turn, is provided with a respective segment of each of the panoramic images, identified by reference numeral 62(s)(A), 62(s)(B), 62(s)(C) (generally identified by reference numeral 62(s)(p), where index "p" refers to the respective panoramic image. As illustrated in FIG. 6, by viewing the lenticular lens from a particular direction, the viewer can selectively view one of the three images 63A, 63B, 63C (generally identified by reference numeral 63p). Thus, for example, if a viewer views the lenticular lens 61 from the right (from above, as shown in FIG. 6), he or she can view the image comprising segments 62(s)(C). On the other hand, if a viewer views the lenticular lens from the left (from below as shown in FIG. 6), he or she can view the image comprising segments 62(s)(A). Finally, if a viewer views the lenticular lens from directly on, he or she can view the image comprising segments 62(s)(B). If, for example the viewer views the lenticular lens such that the left eye views the lens from the right and the left eye views the lens from the left, and if the panoramic image used for segments 62(s)(A) is the left panoramic image of the stereoscopic panoramic image set and the panoramic image used for segments 62(s)(C) is the right panoramic image of the same stereoscopic panoramic image set, the viewer will view the image stereoscopically.

Figure 7:
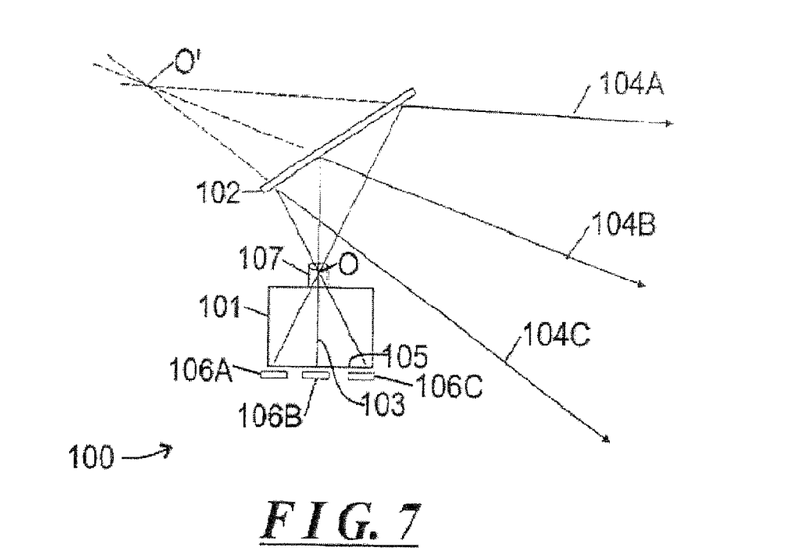
FIGS. 7 through 14 depict illustrative image recording arrangements that may be used in connection with the stereoscopic data source described in connection with FIGS. 2 and 3.
Figure 8:
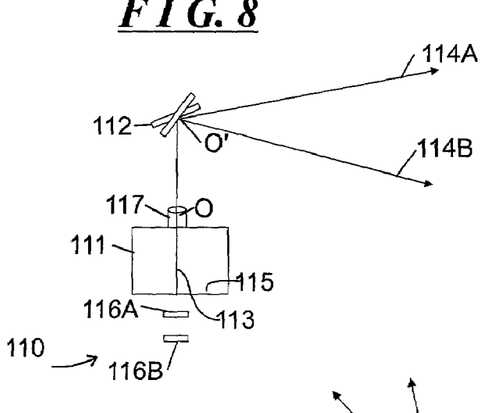
Figure 9:
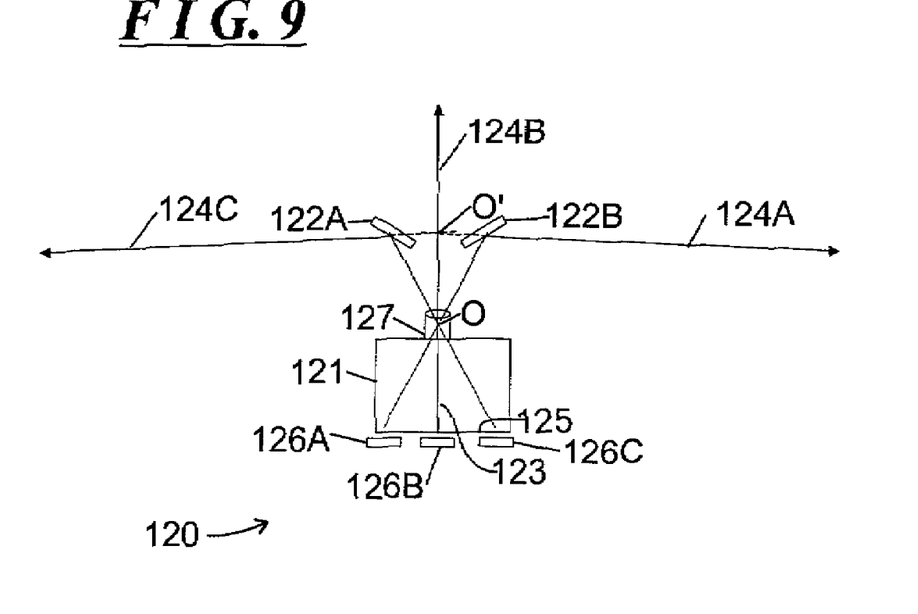
Figure 10:
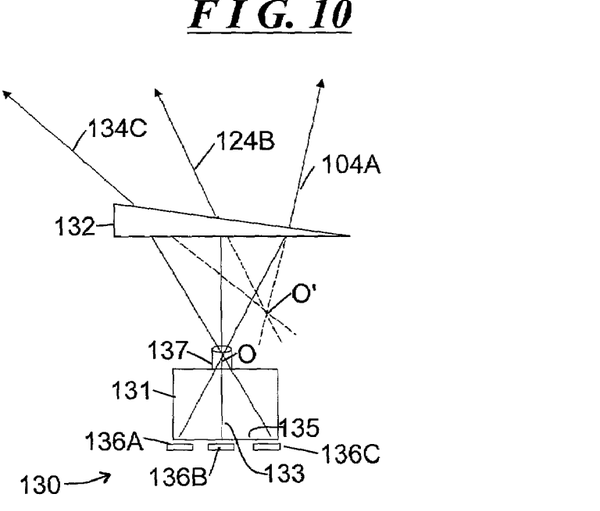
Figure 11:
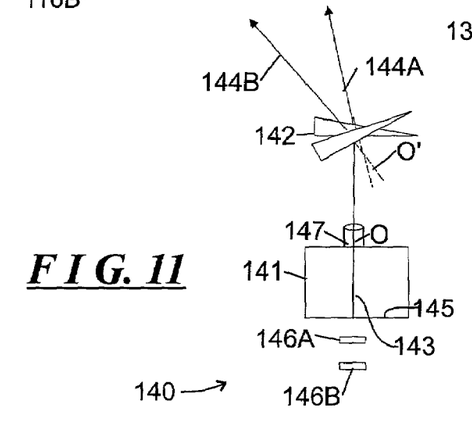
Figure 12:
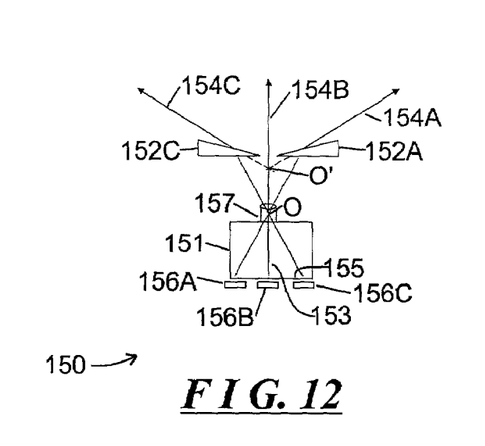
Figure 13:
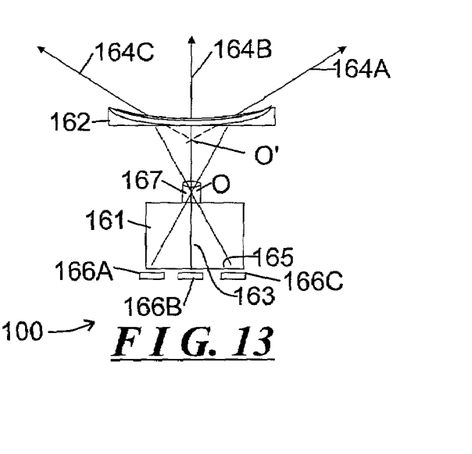
Figure 14:
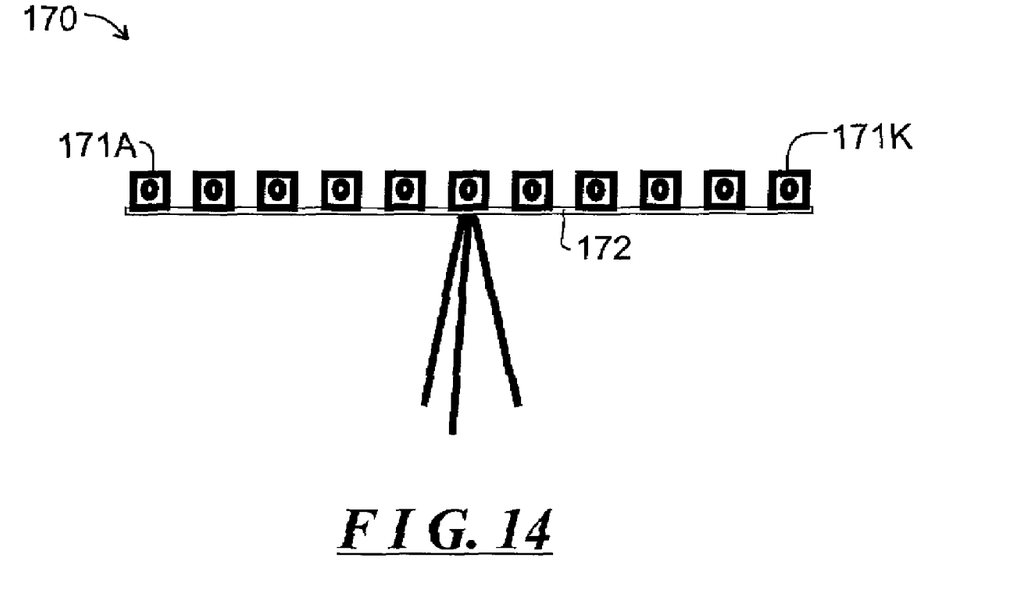

As noted above, the image recording arrangement, which includes the video camera 21 of the illustrative stereoscopic data source 11n, maybe similar to those described in the Peleg I or Peleg II patent applications. As described in those applications, when the camera that records the images that are to be used in generating the panoramic images comprising the stereoscopic panoramic image set is rotated, the center of rotation of the camera will preferably be to the rear of the camera's center of projection to provide that strips obtained from each images will be from a different viewing direction, thereby to facilitate generation of respective panoramic images for the stereoscopic panoramic image set. It will be appreciated, however, that the image recording arrangement used with a stereoscopic data source 11n may have any of a number of other forms, several of which are schematically depicted in FIGS. 7 through 14, which can provide that the effective center of projection is in front of the camera. In those cases, since the effective center of projection is in front of the camera, the center of rotation of the camera can intersect the camera. FIGS. 7 through 9 depict image recording arrangements 100, 110 and 120 that make use of fixed or rotating mirrors or mirror segments, and FIGS. 10 through 12 depict image recording arrangements 130, 140, 150 that make use of fixed or rotating prisms or prism segment, respectively, FIG. 13 depicts an image recording arrangement 160 that makes use of a lens, and FIG. 14 depicts an image recording arrangement 170 that makes use of a plurality of cameras arrayed linearly. Each image recording arrangement 100, 110, 120, 130, 140, 150, 160, includes a respective camera 101, 111, 121, 131, 141, 151, 161, which may be a still or video camera. Image recording arrangement 170 makes use of a plurality of cameras, which may be still or video cameras.

Thus, with reference to FIG. 7, that FIG. schematically depicts an image recording arrangement 100 including a camera 101 and a mirror 102 that is oriented at a fixed angle with respect to the camera's axis 103. The angle is selected so as to be between zero and ninety degrees to facilitate reflecting rays 104A through 104C toward the camera's image sensor 105. As shown in FIG. 7, the rays 104A, 104B and 104C (generally identified by reference numeral 104) as directed toward the image recording arrangement from a scene (not shown) are reflected off the mirror 102 and directed to regions 106A, 106B and 106C, respectively to facilitate recording of an image of the scene. As shown in FIG. 7, the rays 104A, 104B and 104C represent respective viewing directions. Strips including the respective regions can be used in generating respective images for an stereoscopic panoramic image set as described above. As shown in FIG. 7, the mirror 102 serves to relocate the apparent center of projection for the rays 104 from a point O in the optical system 107 of the camera 101 to a point O' well ahead of the camera 101 and the rear of the mirror 102. This will allow the camera 101 to be rotated around a center of rotation that passes through the camera 102, and that can even pass through the camera's center of projection O.

With reference to FIG. 8, that FIG. schematically depicts an image recording arrangement 110 including a camera 111 and a mirror 112 that can be oriented at a plurality of angular orientations with respect to the camera's axis 113. The angles are selected so as to be between zero and ninety degrees to facilitate reflecting rays 114A and 114B toward the center of the camera's image sensor 115. As shown in FIG. 7, the rays 114A and 114B (generally identified by reference numeral 114) as directed toward the image recording arrangement from a scene (not shown) are reflected off the mirror 112 and directed to the same region toward the center of the image sensor 115, with images 16A, 16B, ... being recorded at each of the angular orientations. As shown in FIG. 8, the rays 114A and 114B represent respective viewing directions. The camera 111 records respective images for each of the angular positions at which the mirror 112 is oriented to facilitate recording of respective images of the scene. Strips including the respective regions can be used in generating respective images for an stereoscopic panoramic image set as described above. As shown in FIG. 7, the mirror 112 serves to relocate the apparent center of projection for the rays 114 from a point O in the optical system 117 of the camera 111 to a point O' that conforms to the center of rotation of the mirror 112. As with camera 101, this will allow the camera 111 to be rotated around a center of rotation that passes through the camera 111, and that can even pass through the camera's center of projection O.

With reference to FIG. 9, that FIG. schematically depicts an image recording arrangement 120 including a camera 121 and respective mirror segments 122A, 122B that are positioned on opposite sides of the camera's axis 123 and oriented at complementary fixed angles with respect thereto. The angles is selected so as to be between zero and ninety degrees to facilitate reflecting rays 124A and 124B toward the camera's image sensor 125. As shown in FIG. 9, the rays 124A and 124B (generally identified by reference numeral 124) as directed toward the image recording arrangement from a scene (not shown) are reflected off the mirror segments 122A, 122B and directed to regions 126A and 126B, respectively to facilitate recording of an image of the scene. If, as is the case in connection with arrangement 120, there is a gap between the mirror segments 122A and 122C, a ray 124B in the gap will be directed to a region 126B between regions 126A and 126C. As shown in FIG. 9, the rays 124, 124B and 124C represent respective viewing directions. Strips including the respective regions can be used in generating respective images for an stereoscopic panoramic image set as described above. As shown in FIG. 7, the mirror segments 122A, 122B jointly serve to relocate the apparent center of projection for the rays 104 from a point O in the optical system 127 of the camera 121 to a point O' ahead of the camera 101 and between the mirror segments 122A, 122B. This will allow the camera 121 to be rotated around a center of rotation that passes through the camera 121, and that can even pass through the camera's center of projection O.

FIGS. 10 and 12 schematically depict image recording arrangements 130, 150 that are similar to respective image recording arrangement 100, 120 described above in connection with FIG. 7, 9 except that, instead of using mirrors, the respective image recording arrangement 130, 150 includes a respective prism 132 (in the case of FIG. 10), or prism segments 152 (in the case of FIG. 12), with prism 132, and prism segments 152A, 152C, being disposed at a fixed angle with respect to the camera's axis 134, 154. As with image recording arrangement 100, in image recording arrangement 130, the rays 134A, 134B and 134C (generally identified by reference numeral 134) directed toward the image recording arrangement from a scene (not shown) are refracted by the prism 132 and directed to regions 136A, 136B and 136C, respectively to facilitate recording of an image of the scene, and strips including the respective regions can be used in generating respective images for an stereoscopic panoramic image set as described above. Similarly, as with image recording arrangement 122, in image recording arrangement 150, the rays 154A, 154B and 154C (generally identified by reference numeral 154) as directed toward the image recording arrangement from a scene (not shown) are refracted by off the prism segments 152A, 152C and directed to regions 156A and 156C, respectively to facilitate recording of an image of the scene. If, as is the case in connection with arrangement 150, there is a gap between the prism segments 152A and 152C, a ray 154B in the gap will be directed to a region 156B between regions 156A and 156C. As shown in FIG. 9, the rays 134,134B and 134C (FIG. 10), and rays 154A, 154B and 154C (FIG. 12), represent respective viewing directions. The prism 132 and prism segments 152 serve to relocate the apparent center of projection for the rays 134, 154 from a point O in the optical system 137, 157 of the camera 131, 151 to a point O' that conforms to the center of projection of the respective camera. As with cameras 101, 121, this will allow the camera 131, 151 to be rotated around a center of rotation that passes through the camera 131, 151 and that can even pass through the camera's center of projection O.

FIG. 11 schematically depicts image recording arrangement 140 that is similar to respective image recording arrangement 110 described above in connection with FIG. 8, except that, instead of using mirrors, the image recording arrangement 140 includes a prism 142, which can be disposed a plurality of respective angles with respect to the camera's axis 144. As with image recording arrangement 110, in image recording arrangement 140, the rays 144A, 144B, . . . (generally identified by reference numeral 144) directed toward the image recording arrangement from a scene (not shown) are refracted by the prism 142 and directed toward a region toward the center of the image sensor 145; the camera 141 records respective images 146A, 146B, . . . for the angular positions at which the mirror 142 is oriented to facilitate recording of respective images of the scene. As shown in FIG. 11, the rays 144A, 144B, . . . represent respective viewing directions. The prism 142 serves to relocate the apparent center of projection for the rays 144 from a point O in the optical system 147 of the camera 141 to a point O' that conforms to the center of rotation of the respective camera. As with camera 111, this will allow the camera 141 to be rotated around a center of rotation that passes through the camera 141 and that can even pass through the camera's center of projection O.

FIG. 13 schematically depicts an image recording arrangement 160 that is similar to image recording arrangements 120 and 150 described above in connection with FIGS. 9 and 12, except that, instead of using mirror segments or prism segments, the image recording arrangements 160 includes a lens 162. As with image recording arrangement 100, in image recording arrangement 130, the rays 164A, 164B and 164C (generally identified by reference numeral 164) directed toward the image recording arrangement from a scene (not shown) are refracted by the lens and directed to regions 166A, 166B and 166C, respectively to facilitate recording of an image of the scene, and strips including the respective regions can be used in generating respective images for a stereoscopic panoramic image set as described above. As shown in FIG. 13, the rays 164, 164B and 164C represent respective viewing directions. The lens 162 serves to relocate the apparent center of projection for the rays 164 from a point O in the optical system 167 of the camera 161 to a point O' that conforms to the center of rotation of the camera 161. As with cameras 121, 151, this will allow the camera 161 to be rotated around a center of rotation that passes through the camera 161 and that can even pass through the camera's center of projection O.

It will be appreciated that, in each of the arrangements described above in connection with FIGS. 7 through 13, the respective arrangement records images of a scene, with different portions of the images being from different viewing directions using a single camera, which facilitates generation of respective panoramic images for a stereoscopic panoramic image set that, when viewed contemporaneously, will allow for stereoscopic viewing of images of a scene. FIG. 14 depicts an arrangement 170 that makes use of a plurality of cameras 171A . . . 171K (generally identified by reference numeral 171k) mounted linearly on a platform 172. It will be appreciated that, when the arrangement 170 is pointed in a particular direction to facilitate recording of respective images by the cameras 171k, in the images recorded by the cameras 171k, strips in the "K" respective images as recorded by the respective cameras will be from different viewing directions. As the arrangement 170 is rotated around a center of rotation, and/or translated along a path, the cameras 171k are enabled to record a series of images as described above. In generating respective panoramic images for a stereoscopic panoramic image set, respective strips the series of images recorded by each respective camera $171k'$, $171k''$, . . . may be mosaiced together to form a respective panoramic image. That is, for example, for camera $171k'$, "S" strips $S_1^1, S_1^2, \ldots S_1^S, S_2^1, \ldots S_I^S$ (generally identified by reference numeral $S_1^S$) are obtained from each of "I" images, the "s-th" strip $S_1^S, S_2^S, S_3^S$ from successive images i=1, 2, 3, . . . can be mosaiced together to form a respective panoramic image that can be used in a stereoscopic panoramic image set. Accordingly, it will be appreciated that an arrangement 170 can be used to generate a stereoscopic panoramic image set comprising "S" times "K" panoramic images, that can be used for viewing, printing, and the like.

The invention provides a number of advantages. In particular, the invention provides an arrangement, including a stereoscopic data source for recording images of a scene for use in generating a stereoscopic image set and a viewing device for displaying the stereoscopic image set to provide stereoscopic views of the scene, generating prints, and the like.

It will be appreciated that numerous modifications may be made to the arrangement described herein. For example, although the arrangement has been described as generating, displaying, printing, and so forth, panoramic images, it will be appreciated that the arrangement may instead generate, display, print, and so forth, regular "non-panoramic" images.

In addition, although the stereoscopic data source has been described as generating the stereoscopic image set, it will be appreciated that the stereoscopic data source may record a series of images from which the stereoscopic panoramic image set may be generated. After the stereoscopic data source has recorded the series of images, it can transmit them to the distribution channel 13 for distribution to one or more viewing devices. The distribution channel 13 or viewing devices may themselves generate the images comprising stereoscopic image set. In that case, it will be appreciated that the distribution channel and/or one or more viewing devices will include the components for generating the stereoscopic panoramic image set, which were described above as comprising part of the stereoscopic data source.

Furthermore, although particular mechanisms for facilitating generally contemporaneous viewing of at least portions of images of a stereoscopic image set have been described, it will be appreciated that other mechanisms may be used instead or in addition, including, but not limited to, glasses with lenses of different colors, glasses with lenses of opposite polarizations, alternatively displaying at least two images of an stereoscopic image set sufficiently rapidly so that depth can be viewed, and other mechanisms as will be appreciated by those skilled in the art.

In addition, although the cameras described above in connection with FIGS. 7 through 14 have been described as comprising conventional still or video cameras, it will be appreciated that they may comprise cameras in which image recording elements are provided only in the portions of the respective image planes from which strips will be obtained for use in generating the respective images of the stereoscopic image set.

Furthermore, although the invention has been described such that segments of respective images from a stereoscopic panoramic image set are displayed and viewed through a lenticular lens, it will be appreciated that they may instead be printed and viewed through a lenticular lens, printed directly on the rear of the lenticular lens, or other arrangements as will be apparent to those skilled in the art. If, for example, the images are printed on the rear of the lenticular lens, it will be appreciated that the lenticular curved forward surface may be formed before, during or after the images are printed.

In addition, although, in the description above in connection with FIG. 5, the strips for each panoramic image of the stereoscopic panoramic image set are indicated as being from the same horizontal displacement in the successive images, it will be appreciated that they may be from different horizontal displacements as described in the Peleg III patent application. This may be useful in connection with to accommodate adjustment of disparity if desired to accommodate stereoscopic depth.

It will be appreciated that a system in accordance with the invention can be constructed in whole or in part from special purpose hardware or a general purpose computer system, or any combination thereof, any portion of which may be controlled by a suitable program. Any program may be composed of instructions encoded in a computer-readable medium that may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. Imaging apparatus comprising:
    at least one imager that moves relative to a scene so as to acquire a plurality of optical images of at least portions of the scene, each of at least two of said optical images being viewed from a different respective viewing position;
    a processor that receives image data representative of said at least two of the optical images and processes the data to divide each image into a plurality of segments and to generate a plurality of mosaics of the scene, such that:
    each mosaic contains segments taken from different ones of said optical images;
    segments relating to at least one part of the scene are derived from at least two optical images and appear in at least two mosaics;
    the different segments of the two optical images in a given mosaic represent different parts of the scene; and
    a display that receives a plurality of the mosaics and displays them so as to provide a sense of depth of the scene.

2. Imaging apparatus according to claim 1 wherein the imaging apparatus is a portable hand-held device including a housing for accommodating the at least one imager, the processor and the display.

3. Imaging apparatus according to claim 1 and comprising communication apparatus that transmits image data from the imaging apparatus.

4. Imaging apparatus according to claim 3 wherein the communication apparatus is housed in a housing that also accommodates the at least one imager, the processor and the display.

5. Imaging apparatus according to claim 3 wherein the image data transmitted by the communication apparatus comprises at least a portion of a mosaic.

6. Imaging apparatus according to claim 3 wherein the image data transmitted by the communication apparatus comprises image data provided by the at least one imager.

7. Imaging apparatus according to claim 3 wherein the communication apparatus comprises apparatus for transmitting the data over a wireless communication channel.

8. Imaging apparatus according to claim 7 wherein the communication channel comprises a cellular telephone channel.

9. Imaging apparatus according to claim 1 wherein the display displays at least two of the mosaics one after another sufficiently rapidly to provide the sense of depth.

10. Imaging apparatus according to claim 1 wherein the display displays the at least two mosaics so that each eye sees a different one of the mosaics.

11. Imaging apparatus according to claim 1 wherein mosaics of the plurality of mosaics comprise panoramic mosaics.

12. Imaging apparatus according to claim 1 wherein the processor adjusts disparity between mosaics of the plurality of mosaics to provide selected visual effects.

13. Imaging apparatus according to claim 12 wherein the processor adjusts disparity between mosaics of the plurality of mosaics to provide at least one selected disparity for objects in the scene.

14. Imaging apparatus according to claim 12 wherein the processor adjusts disparity between mosaics so that a disparity for objects at a finite distance in the scene is at least a disparity required for human stereo fusion.

15. Imaging apparatus according to claim 12 wherein the processor adjusts disparity between mosaics so that disparity for all objects in the scene is within a predetermined range.

16. Imaging apparatus according to claim 12 wherein the processor adjusts disparity for different objects in the scene differently.

17. Imaging apparatus according to claim 1 wherein the at least one imager acquires image data from the scene used to generate a mosaic at a same time.

18. Imaging apparatus according to claim 1 wherein the at least one imager acquires image data of the scene used to generate at least two mosaics of the plurality of mosaics at a same time.

19. Imaging apparatus according to claim 1, comprising a housing that accommodates the at least one imager, the processor and the display.

20. Imaging apparatus according to claim 1, wherein the processor is adapted to generate at least three series of image strips, each of said series comprising strips of a series of images of a scene as would be recorded by a camera from a respective series of positions relative to the scene, the image strips of the respective series representing strips of the respective images, said strips being displaced from one another by at least one selected displacement; and being further adapted to mosaic the respective series of image strips together thereby to construct said plurality of mosaics of the scene.

21. Imaging apparatus according to claim 10, wherein the display is a lenticular print.

22. Imaging apparatus comprising:
 at least one imager that moves relative to a scene so as to acquire a plurality of optical images of at least portions of the scene, each of at least two of said optical images being viewed from a different respective viewing position;
 a processor that receives image data representative of said at least two of the optical images and processes the data to divide each image into a plurality of segments and to generate a plurality of mosaics of the scene, such that each mosaic contains segments taken from different ones of said optical images and such that at least two of the optical images contributes a different segment to each of at least two of the mosaics and such that the different segments of the two optical images in a given mosaic represent different parts of the scene; and
 a display that receives a plurality of the mosaics and displays them so as to provide a sense of depth of the scene.

23. Imaging apparatus according to claim 22 and comprising communication apparatus that transmits image data from the imaging apparatus.

24. Imaging apparatus according to claim 22 wherein the display displays at least two of the mosaics one after another sufficiently rapidly to provide the sense of depth.

25. Imaging apparatus according to claim 1, wherein, in respect of any two of said optical images that both contribute at least two different segments to each of any two mosaics, the segments contributed by both optical images to a first one of the mosaics are all to the left of the segments contributed by both optical images to a second one of the mosaics.

26. Imaging apparatus comprising:
 at least one imager that moves relative to a scene so as to acquire a plurality of optical images of at least portions of the scene, each of at least two of said optical images being viewed from a different respective viewing position;
 a processor that receives image data responsive to said at least two of the optical images and processes the data to divide each image into a plurality of segments and to generate a plurality of mosaics of the scene, such that:
 each mosaic contains segments taken from different ones of said optical images;
 at least two of the optical images contributes a different segment to each of at least two of the mosaics; and
 the different segments of the two optical images in a given mosaic represent different parts of the scene,
 wherein respective first segments of each optical image contributed to a first mosaic image are always to the left of respective second segments of the respective optical image contributed to a second mosaic image; and
 a display that receives a plurality of the mosaics and displays them so as to provide a sense of depth of the scene.

27. Imaging apparatus comprising:
 at least one imager that moves relative to a scene so as to acquire a plurality of optical images of at least portions of the scene, each of at least two of said optical images being viewed from a different respective viewing position;
 a processor that receives image data representative of said at least two of the optical images and processes the data to divide each image into a plurality of segments and to generate a plurality of mosaics of the scene, such that:
 each mosaic contains segments taken from different ones of said optical images;
 at least two different segments in each mosaic relate to a different part of the scene that appears in each of the two respective optical images;
 segments relating to at least one part of the scene are derived from at least two optical images and appear in at least two mosaics; and
 in respect of any two of said optical images that both contribute at least two different segments to each of any two mosaics, the segments contributed by both optical images to a first one of the mosaics are all to the left of the segments contributed by both optical images to a second one of the mosaics; and
 a display that receives a plurality of the mosaics and displays them so as to provide a sense of depth of the scene.

28. Imaging apparatus according to claim 27 wherein the imaging apparatus is a portable hand-held device including a housing for accommodating the at least one imager, the processor and the display.

29. Imaging apparatus according to claim 27 and comprising communication apparatus that transmits image data from the imaging apparatus.

30. Imaging apparatus according to claim 29 wherein the communication apparatus is housed in a housing that also accommodates the at least one imager, the processor and the display.

31. Imaging apparatus according to claim 29 wherein the image data transmitted by the communication apparatus comprises at least a portion of a mosaic.

32. Imaging apparatus according to claim 29 wherein the image data transmitted by the communication apparatus comprises image data provided by the at least one imager.

33. Imaging apparatus according to claim 29 wherein the communication apparatus comprises apparatus for transmitting the data over a wireless communication channel.

34. Imaging apparatus according to claim 33 wherein the communication channel comprises a cellular telephone channel.

35. Imaging apparatus according to claim 27 wherein the display displays at least two of the mosaics one after another sufficiently rapidly to provide the sense of depth.

36. Imaging apparatus according to claim 27 wherein the display displays at least two of the mosaics so that each eye sees a different one of the mosaics.

37. Imaging apparatus according to claim 27, wherein the processor is adapted to generate at least three series of image strips, each of said series comprising strips of a series of images of a scene as would be recorded by a camera from a respective series of positions relative to the scene, the image strips of the respective series representing strips of the respective images, said strips being displaced from one another by at least one selected displacement; and being further adapted to mosaic the respective series of image strips together thereby to construct said plurality of mosaics of the scene.

38. A method for processing image data representative of at least portions of a scene acquired by at least one imager that moves relative to a scene so as to acquire a plurality of optical images of the scene, each of at least two of said optical images being viewed from a different respective viewing position, the method comprising:

dividing each image into a plurality of segments and generating a plurality of mosaics of the scene, such that:

each mosaic contains segments taken from different ones of said optical images;

segments relating to at least one part of the scene are derived from at least two optical images and appear in at least two mosaics;

the different segments of the two optical images in a given mosaic represent different parts of the scene; and in respect of any two of said optical images that both contribute at least two different segments to each of any two mosaics, the segments contributed by both optical images to a first one of the mosaics are all to the left of the segments contributed by both optical images to a second one of the mosaics; and displaying a plurality of the mosaics so as to provide a sense of depth of the scene.

39. The method according to claim 38 wherein said displaying comprises displaying at least two of the mosaics one after another sufficiently rapidly to provide the sense of depth.

40. The method according to claim 38 wherein said displaying comprises displays the at least two mosaics so that each eye sees a different one of the mosaics.

41. The method according to claim 38 wherein said generating comprises adjusting disparity between mosaics of the plurality of mosaics to provide selected visual effects.

42. The method according to claim 41 wherein said adjusting disparity between mosaics of the plurality of mosaics comprises providing at least one selected disparity for objects in the scene.

43. The method according to claim 41 wherein said adjusting disparity between mosaics of the plurality of mosaics comprises providing a at least disparity for objects at a finite distance in the scene that is required for human stereo fusion.

44. The method according to claim 41 wherein said adjusting disparity between mosaics of the plurality of mosaics is performed so that disparity for all objects in the scene is within a predetermined range.

45. The method according to claim 41 wherein said adjusting disparity between mosaics of the plurality of mosaics comprises adjusting disparity for different objects in the scene differently.

46. The method according to claim 38, wherein: said dividing comprises generating at least three series of image strips, each of said series comprising strips of a series of images of a scene as would be recorded by a camera from a respective series of positions relative to the scene, the image strips of the respective series representing strips of the respective images, said strips being displaced from one another by at least one selected displacement; and said generating comprises mosaicking the respective series of image strips together thereby to construct said plurality of mosaics of the scene.

47. Method for processing image data representative of at least portions of a scene acquired by at least one imager that moves relative to a scene so as to acquire a plurality of optical images of the scene, each of at least two of said optical images being viewed from a different respective viewing position, the method comprising:

dividing each image into a plurality of segments and generating a plurality of mosaics of the scene, such that:

each mosaic contains segments taken from different ones of said optical images;

at least two different segments in each mosaic relate to a different part of the scene that appears in each of the two respective optical images;

segments relating to at least one part of the scene are derived from at least two optical images and appear in at least two mosaics; and in respect of any two of said optical images that both contribute at least two different segments to each of any two mosaics, the segments contributed by both optical images to a first one of the mosaics are all to the left of the segments contributed by both optical images to a second one of the mosaics; and displaying a plurality of the mosaics so as to provide a sense of depth of the scene.

48. The method according to claim 47 wherein said displaying comprises displaying at least two of the mosaics one after another sufficiently rapidly to provide the sense of depth.

49. The method according to claim 47 wherein said displaying comprises displays the at least two mosaics so that each eye sees a different one of the mosaics.

50. The method according to claim 47 wherein said generating comprises adjusting disparity between mosaics of the plurality of mosaics to provide selected visual effects.

51. The method according to claim 50 wherein said adjusting disparity between mosaics of the plurality of mosaics comprises providing at least one selected disparity for objects in the scene.

52. The method according to claim 50 wherein said adjusting disparity between mosaics of the plurality of mosaics comprises providing a at least disparity for objects at a finite distance in the scene that is required for human stereo fusion.

53. The method according to claim 50 wherein said adjusting disparity between mosaics of the plurality of mosaics is performed so that disparity for all objects in the scene is within a predetermined range.

54. The method according to claim 50 wherein said adjusting disparity between mosaics of the plurality of mosaics comprises adjusting disparity for different objects in the scene differently.

55. The method according to claim 47, wherein: said dividing comprises generating at least three series of image strips, each of said series comprising strips of a series of images of a scene as would be recorded by a camera from a respective series of positions relative to the scene, the image strips of the respective series representing strips of the respective images, said strips being displaced from one another by at least one selected displacement; and said generating comprises mosaicking the respective series of image strips together thereby to construct said plurality of mosaics of the scene.

* * * * *